Sept. 4, 1962    W. G. DE PIERRI, JR., ET AL    3,052,741
RECOVERY OF 1,3,5-TRIMETHYLBENZENE BY ALKYLATION
OF $C_9$ ISOMERS WITH ALUMINUM CHLORIDE
Filed Dec. 23, 1959
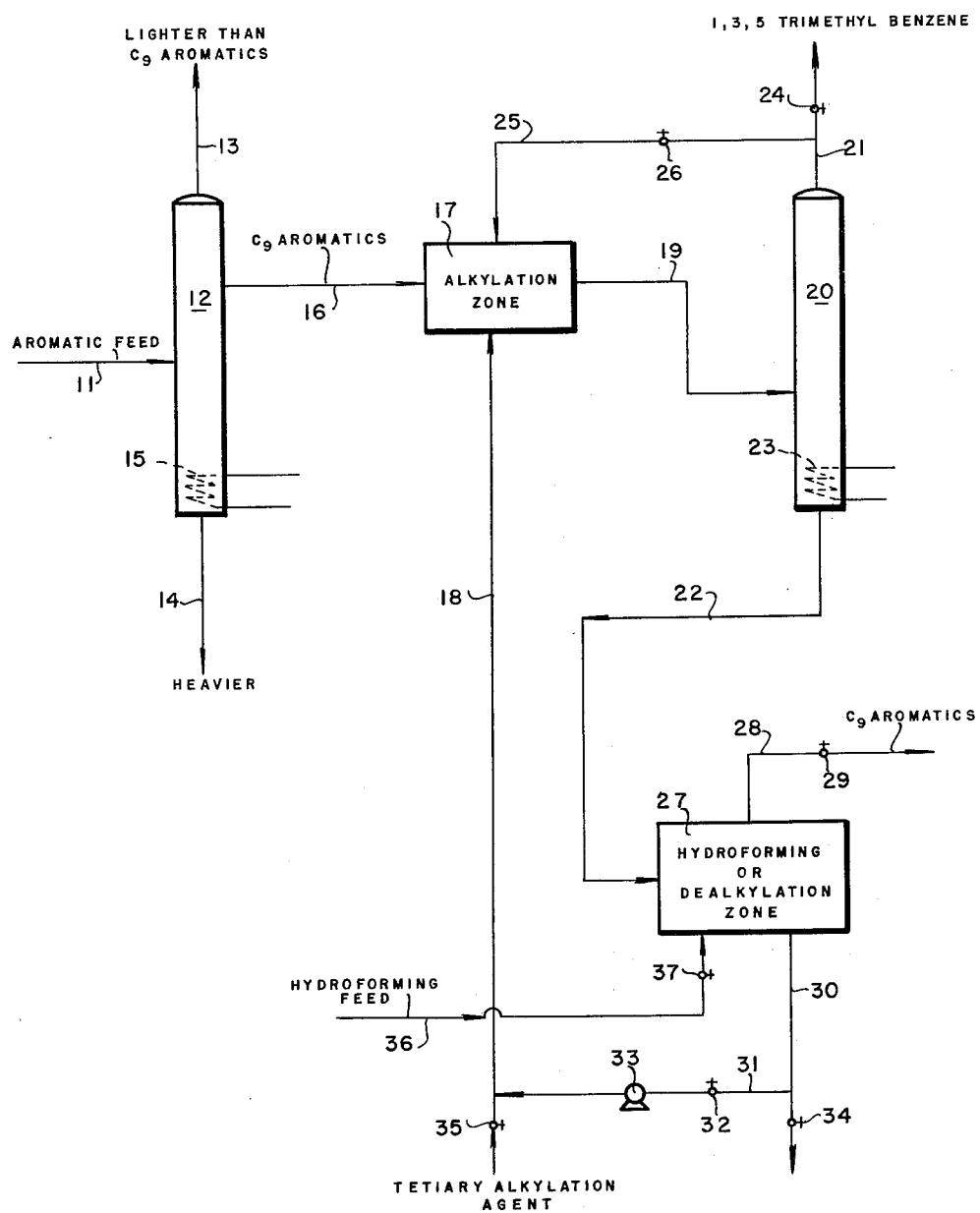
INVENTORS.
WILLIAM G. De PIERRI, JR.,
WILLIAM R. EDWARDS,
BY HARRY G. BOYNTON,
ATTORNEY.

United States Patent Office 3,052,741
Patented Sept. 4, 1962

3,052,741
RECOVERY OF 1,3,5-TRIMETHYLBENZENE BY ALKYLATION OF C₉ ISOMERS WITH ALUMINUM CHLORIDE
William G. De Pierri, Jr., and William R. Edwards, Baytown, Tex., and Harry G. Boynton, Berkeley Heights, N.J., assignors, by mesne assignments, to Esso Research and Engineering Company, Elizabeth, N.J., a corporation of Delaware
Filed Dec. 23, 1959, Ser. No. 861,540
7 Claims. (Cl. 260—671)

The present invention is directed to a method for recovering 1,3,5-trimethylbenzene. More particularly, the invention is concerned with recovering purified 1,3,5-trimethylbenzene from its mixtures with $C_9$ aromatic isomers. In its more specific aspects, the invention is concerned with recovering 1,3,5-trimethylbenzene in an alkylation operation in which the 1,3,5-trimethylbenzene is not alkylated.

The present invention may be briefly described as a method for recovering 1,3,5-trimethylbenzene from a mixture with its $C_9$ aromatic isomers boiling in the range from about 300° to about 360° F. In this operation, the mixture is alkylated with a tertiary olefin having 4 to 6 carbon atoms in the molecule at a tempearture in the range from about 70° to about 200° F. in the presence of 1.0% to 15% $AlCl_3$ based on the total aromatic content of the mixture under conditions to form an alkylated product containing alkylated $C_9$ aromatic isomers and 1,3,5-trimethylbenzene. The tertiary olefins and $C_9$ aromatic isomers are present in a ratio in the range from about 1 to about 1.5:1 and the tertiary olefins and total aromatics are present in a ratio less than 1:3. The product is recovered and distilled to recover purified 1,3,5-trimethylbenzene and the alkylated $C_9$ aromatic isomers then may be subjected to dealkylation operation to recover the tertiary olefin and the $C_9$ aromatic isomers.

In the practice of the present invention, a temperature in the range from about 70° to about 200° F. is suitably employed under sufficient pressure to maintain a liquid phase during the alkylation.

The feed stock of the present invention suitably boils in the range from about 300° to about 360° F. but may boil in the range from about 310° to about 350° F. The $C_9$ aromatic isomers include orthoethyltoluene, metaethyltoluene, paraethyltoluene, normal propylbenzene, isopropylbenzene, 1,2,3-trimethylbenzene, and 1,2,4-trimethylbenzene.

It is exceedingly difficult to separate these compounds by distillation to recover the desired 1,3,5-trimethylbenzene which is a very desirable chemical intermediate for the manufacture of tri-functional materials since it is the only trimethylbenzene which has a symmetrical structure. To illustrate the magnitude of the separation problem, the following table lists the several $C_9$ aromatic isomers and the boiling points thereof.

| $C_9$ isomers: | B.P., °C. |
|---|---|
| o-Ethyltoluene | 165 |
| m-Ethyltoluene | 163 |
| p-Ethyltoluene | 163 |
| n-Propylbenzene | 159 |
| Isopropylbenzene | 152 |
| 1,2,3-trimethylbenzene | 176 |
| 1,2,4-trimethylbenzene | 169 |
| 1,3,5-trimethylbenzene | 165 |

From the foregoing table, it will be clear that the compounds have very close boiling points and that it is difficult to separate the 1,3,5-trimethylbenzene by distillation.

Not only is it difficult to separate the $C_9$ aromatic compounds by distillation, but heretofore, it has also been thought that the compounds could not be separated by alkylation. For example, p-ethyltoluene and 1,2,4-trimethylbenzene were thought not to be separable from 1,3,5-trimethylbenzene by selective alkylation of the p-ethyltoluene and 1,2,4-trimethylbenzene. In accordance with the present invention, all of the $C_9$ aromatic isomers excepting 1,3,5-trimethylbenzene, are alkylated with a tertiary olefin to form a product containing the alkylated aromatic hydrocarbon and 1,3,5-trimethylbenzene which is separable therefrom by distillation.

The tertiary olefins employed in the practice of the present invention are those tertiary alkylation agents such as isobutylene, the pentylenes having a tertiary carbon atom and the tertiary hexylenes. Isobutylene and the methylbutenes substituted on the carbon atom adjacent the double bond and the hexenes also having a tertiary carbon atom may be employed as the alkylation agent. Thus, the $C_5$ and $C_6$ tertiary olefins having a double bond adjacent a methyl- or ethyl-substituted carbon atom may be employed.

In the practice of the present invention, it is contemplated that at least a portion of the 1,3,5-trimethylbenzene, which is the desirable product, will be recycled to the alkylation zone. This is necessary to provide the proper ratio of the tertiary olefin and the total aromatics. If the ratio of tertiary olefins and total aromatics in the alkylation zone is not less than 1:3, undesirable reactions such as polymerization will occur. Furthermore, it is important that the ratio of the tertiary olefin and $C_9$ aromatic isomers in the alkylation zone be in the range from about 1 to about 1.5:1 since otherwise, if the ratio is below this range, incomplete alkylation will occur, resulting in impurities in the mesitylene.

The present invention will be further illustrated by reference to the drawing in which the single FIGURE is a flow diagram of a preferred mode. Referring now to the drawing, an aromatic hydrocarbon feed such as one boiling in the range from about 300° to about 360° F. from a source not shown, but which may be obtained from a hydroforming operation, catalytic-conversion operation or catalytic cracking or from extraction of a virgin stream, is introduced into the system through line 11 into a fractional distillation zone 12 which is illustrated as a single distillation tower provided with line 13 to obtain an overhead fraction, line 14 for taking off a bottom fraction and with heating means illustrated by steam coil 15. Distillation zone 12 is understood to be provided with all facilities usually found in the modern distillation tower which will include means for inducing reflux, suitable vapor-liquid internal contacting means such as bell cap trays and the like. In any event, conditions are adjusted in zone 12 to remove a light fraction, lighter than $C_9$ aromatics, overhead by way of line 13 and a heavy fraction, heavier than $C_9$ aromatics by line 14. The desired $C_9$ aromatics, including the three ethyltoluenes, n-propyl- and isopropylbenzenes, 1,2,3- and 1,2,4- and 1,3,5-trimethylbenzenes are removed from zone 12 by way of line 16 and introduced thereby into an alkylation zone 17 into which a tertiary alkylation agent such as isobutylene or a methylbutene is introduced by line 18 from a source which will be described hereinafter. The catalyst employed in zone 17 is suitably aluminum chloride which is used in the range of 1.0 to about 15% by weight of aluminum chloride based on the total aromatic content of the feed stock introduced by line 16. Under the conditions prevailing in zone 17 an alkylated product is formed which is withdrawn by line 19 into a distillation zone 20 provided with an overhead line 21, a bottom line 22 and a heating means illustrated by steam coil 23. Distillation zone 20 may be similar to and provided with identical facilities to distillation zone 12. Conditions are adjusted in zone 20 to remove the 1,3,5-trimethylbenzene from the $C_9$ aromatic hydrocarbons which were in the feed introduced into zone 15, the alkylation of the $C_9$ aromatic hydrocarbons making this possible. By virtue of the difference in boiling points, it is possible to recover the 1,3,5-trimethylbenzene in substantially purified condition. For example, a 1,3,5-trimethylbenzene fraction of above 95% purity is obtainable and may be discharged from the system by opening valve 24 in line 21. A portion of the 1,3,5-trimethylbenzene in line 21 is recycled, as desired, by way of line 25 controlled by valve 26 to zone 17 to provide the proper ratio of tertiary olefin and total aromatic such that undesirable side reactions such as polymerization of the olefin will not occur.

The alkylated $C_9$ aromatic isomers in line 22 are discharged thereby into zone 27 which may be a hydroforming zone or a thermal or catalytic dealkylation zone. For example, if zone 27 is a catalytic dealkylation zone, it will suitably employ a silica-alumina catalyst and temperatures in the range from about 500 to 800° F. may be used. If zone 27 is a hydroforming zone, it may employ a suitable molybdenum or platinum catalyst. When zone 27 is a hydroforming zone, a naphthenic hydrocarbon feed may be introduced thereto by line 36 controlled by valve 37. In any event, in zone 27, conditions are adjusted so that the alkylated $C_9$ aromatic isomers are dealkylated to obtain the $C_9$ aromatic hydrocarbons which are removed by way of line 28. The tertiary alkylation agent is withdrawn from zone 27 by way of line 30 and preferably is recycled through line 31, valve 32, and pump 33 to line 18.

If it is desired to withdraw the $C_9$ aromatic hydrocarbons from the system, this may be done by opening valve 29 in line 28. Likewise, if it is desired to withdraw the tertiary alkylation agent from the system, this may be accomplished by opening valve 34 in line 31. Fresh tertiary alkylation agent may be introduced into line 18 by opening valve 35.

The maintenance of the desirable ratio of tertiary olefin and $C_9$ aromatic isomers in the range from about 1 to 1.5:1 and the tertiary olefin and total aromatic in the ratio less than 1:3 may suitably be accomplished by recycling a portion of the 1,3,5-trimethylbenzene by way of line 25.

A feature of the present invention is the alkylation of all of the $C_9$ aromatic isomers excepting the 1,3,5-trimethylbenzene, it having been discovered that under the conditions set out herein the $C_9$ aromatic isomers excepting 1,3,5-trimethylbenzene will be substantially completely alkylated, whereas the 1,3,5-trimethylbenzene is substantially unaffected. For example, heretofore, it was thought that it would not be possible to remove p-ethyltoluene and 1,2,4-trimethylbenzene by alkylation. However, in accordance with the present invention, the three ethyltoluenes, the normal propyl- and isopropylbenzenes and the two triethylbenzenes, other than 1,3,5-trimethylbenzene, are alkylated and therefore the 1,3,5-trimethylbenzene is obtainable in substantially purified condition by distillation.

In order to illustrate the invention further, 78 parts of a mesitylene concentrate were charged to a stirred reactor into which 2 mol percent of aluminum chloride was added along with 28 parts of a methylbutene concentrate consisting of 10% 2-methylbutene-1, and 90% 2-methylbutene-2. The olefins were added over a 10-minute period and the mixture maintained at 90° to 120° F. and the mixture was then held for an additional hour after olefin addition had ceased. The resulting product was water washed and distilled and 51 parts of 93% mesitylene were recovered. The remainder was alkylated aromatic hydrocarbons.

In another operation, a feed stock containing the three ethyltoluenes, normal propylbenzene, isopropylbenzene, 1,2,3-trimethylbenzene and 1,2,4-trimethylbenzene is alkylated at 150° F. with isobutylene to form an alkylated product in the presence of 5% aluminum chloride based on the total aromatic content. The ratio of tertiary olefin to $C_9$ aromatic isomers is approximately 1.3:1 and the tertiary olefin and total aromatic ratio is approximately 0.2:1. A product was obtained and is then distilled to recover purified 1,3,5-trimethylbenzene. In this particular instance, the 1,2,3-trimethylbenzene and 1,2,4-trimethylbenzene are substantially completely alkylated such that the 1,3,5-trimethylbenzene is recoverable therefrom by distillation. In this operation, the other $C_9$ aromatic isomers were also alkylated. In short, in the practice of the present invention, it has been found that 1,3,5-trimethylbenzene is not alkylated under these conditions, but surprisingly, the other $C_9$ aromatic isomers are alkylated, thus allowing the 1,3,5-trimethylbenzene to be removed and recovered in substantial purity.

The present invention is quite important and useful in that 1,3,5-trimethylbenzene is important not only as a chemical intermediate but is also useful as an additive for various motor fuels.

The nature and objects of the present invention having been completely described and illustrated, what we wish to claim as new and useful and secure by Letters Patent is:

1. A method for recovering 1,3,5-trimethylbenzene from a mixture with its $C_9$ aromatic isomers, including 1,2,4-trimethylbenzene, boiling in the range from about 300° to about 360° F. which comprises alkylating said mixture with a tertiary olefin having 4 to 6 carbon atoms in the molecule at a temperature in the range from about 70° to about 200° F. in the presence of 1.0 to 15% $AlCl_3$ based on the total aromatic content of said mixture under conditions to form an alkylated product containing alkylated $C_9$ aromatic isomers and 1,3,5-trimethylbenzene, the tertiary olefin and $C_9$ aromatic isomers being in the ratio in the range from about 1 to about 1.5:1 and the tertiary olefin and total aromatics being in a ratio less than 1:3, recovering said product, and distilling said product to recover purified 1,3,5-trimethylbenzene.

2. A method in accordance with claim 1 in which sufficient pressure is employed to maintain a liquid phase during said alkylation.

3. A method in accordance with claim 1 in which the ratio of tertiary olefin to total aromatics is maintained by recycling a portion of the recovered 1,3,5-trimethylbenzene.

4. A method for recovering 1,3,5-trimethylbenzene from a mixture with its $C_9$ aromatic isomers, including 1,2,4-trimethylbenzene, boiling in the range from about 300° to about 360° F. which comprises alkylating said mixture with isobutylene at a temperature in the range from about 70° to about 200° F. in the presence of 1.0 to 15% $AlCl_3$ based on the total aromatic content of said mixture under conditions to form an alkylated product containing alkylated $C_9$ aromatic isomers and 1,3,5-trimethylbenzene, the tertiary olefin and $C_9$ aromatic isomers being in a ratio in the range from 1 to about 1.5:1 and the tertiary olefin and total aromatics being in a ratio less than 1:3, recovering said product, and distilling said product to recover purified 1,3,5-trimethylbenzene.

5. A method for recovering 1,3,5-trimethylbenzene from a mixture with its $C_9$ aromatic isomers, including 1,2,4-trimethylbenzene, boiling in the range from about 300° to about 360° F. which comprises alkylating said mixture with methylbutene substituted on the carbon atom adjacent the double bond at a temperature in the range from about 70° to about 200° F. in the presence of 1.0 to 15% $AlCl_3$ based on the total aromatic content of said mixture under conditions to form an alkylated product containing alkylated $C_9$ aromatic isomers and 1,3,5-trimethylbenzene, the tertiary olefin and $C_9$ aromatic isomers being in a ratio in the range from about 1 to about 1.5:1 and the tertiary olefin and total aromatics being in a ratio less than 1:3, recovering said product, and distilling said product to recover purified 1,3,5-trimethylbenzene.

6. A method for recovering 1,3,5-trimethylbenzene from a mixture with its C$_9$ aromatic isomers including o-ethyltoluene, m-ethyltoluene, p-ethyltoluene, n-propylbenzene, isopropylbenzene, 1,2,3-trimethylbenzene and 1,2,4-trimethylbenzene boiling in the range from about 300° to about 360° F. which comprises alkylating said mixture with a tertiary olefin having 4 to 6 carbon atoms in the molecule at a temperature in the range from about 70° to about 200° F. in the presence of 1.0 to 15% AlCl$_3$ based on the total aromatic content of said mixture under conditions to form an alkylated product containing alkylated C$_9$ aromatic isomers and 1,3,5-trimethylbenzene, the tertiary olefin and C$_9$ aromatic isomers being in a ratio in the range from about 1 to about 1.5:1 and the tertiary olefin and total aromatics being in a ratio less than 1:3, recovering said product, and distilling said product to recover purified 1,3,5-trimethylbenzene.

7. A method for recovering 1,3,5-trimethylbenzene from a mixture with its C$_9$ aromatic isomers, including 1,2,4-trimethylbenzene, boiling in the range from about 300° to about 360° F. which comprises alkylating said mixture with a tertiary olefin having 4 to 6 carbon atoms in the molecule at a temperature in the range from about 70° to about 200° F. in the presence of 1.0 to 15% AlCl$_3$ based on the total aromatic content of said mixture under conditions to form an alkylated product containing alkylated C$_9$ aromatic isomers and 1,3,5-trimethylbenzene, the tertiary olefin and C$_9$ aromatic isomers being in a ratio in the range from about 1 to about 1.5:1 and the tertiary olefin and total aromatics being in a ratio less than 1:3, recovering said product, distilling said product to recover purified 1,3,5-trimethylbenzene, and said alkylated C$_9$ aromatic isomers, and dealkylating said alkylated C$_9$ aromatic isomers under conditions to recover said tertiary olefin and said C$_9$ aromatic isomers.

References Cited in the file of this patent
UNITED STATES PATENTS

| | | |
|---|---|---|
| 2,816,940 | Schlatter | Dec. 17, 1957 |
| 2,929,956 | Wadsworth | Mar. 22, 1960 |